United States Patent
Kawai et al.

(10) Patent No.: US 12,441,268 B2
(45) Date of Patent: Oct. 14, 2025

(54) FRONT CENTER AIRBAG DEVICE FOR VEHICLE

(71) Applicant: TOYOTA JIDOSHA KABUSHIKI KAISHA, Toyota (JP)

(72) Inventors: Takuma Kawai, Okazaki (JP); Jiro Ohachi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/975,038

(22) Filed: Dec. 10, 2024

(65) Prior Publication Data

US 2025/0242775 A1  Jul. 31, 2025

(30) Foreign Application Priority Data

Jan. 29, 2024  (JP) .................................. 2024-011059

(51) Int. Cl.
| | | |
|---|---|---|
| B60R 21/207 | (2006.01) | |
| B60R 21/237 | (2006.01) | |
| B60R 21/264 | (2006.01) | |
| B60R 21/00 | (2006.01) | |

(52) U.S. Cl.
CPC .......... B60R 21/207 (2013.01); B60R 21/237 (2013.01); B60R 21/264 (2013.01); *B60R 2021/0006* (2013.01)

(58) Field of Classification Search
CPC .......... B60R 21/207; B60R 2021/0006; B60R 21/264
See application file for complete search history.

(56) References Cited

U.S. PATENT DOCUMENTS

| | | | |
|---|---|---|---|
| 8,210,566 B2 * | 7/2012 | Fukawatase | .......... B60R 21/231 |
| | | | 280/730.2 |
| 9,193,326 B2 * | 11/2015 | Fukawatase | ........ B60R 21/0136 |
| 9,290,151 B2 * | 3/2016 | Fujiwara | ............... B60R 21/231 |
| 2014/0042733 A1 | 2/2014 | Fukawatase | |
| 2024/0286571 A1 | 8/2024 | Ueda | |

FOREIGN PATENT DOCUMENTS

| | | | |
|---|---|---|---|
| CN | 210591776 U | * | 5/2020 |
| JP | 2014-034356 A | | 2/2014 |
| JP | 2019-059250 A | | 4/2019 |
| JP | 2019-172023 A | | 10/2019 |
| JP | 2019-177717 A | | 10/2019 |
| JP | 2019-177724 A | | 10/2019 |
| JP | 2024-120765 A | | 9/2024 |

\* cited by examiner

*Primary Examiner* — Faye M Fleming
(74) *Attorney, Agent, or Firm* — SoraIP, Inc.

(57) ABSTRACT

The front center airbag device for a vehicle includes a front center airbag mounted on an inner side in a vehicle width direction in a seatback of a vehicle seat serving as a driver's seat and inflated and deployed by supplying gas from the inflator, wherein the front center airbag is configured such that when a side collision of the vehicle is on the driver's seat side, a deployment region in the vehicle front-rear direction is larger and an internal pressure is smaller than when a side collision of the vehicle is on the passenger's seat side.

5 Claims, 6 Drawing Sheets

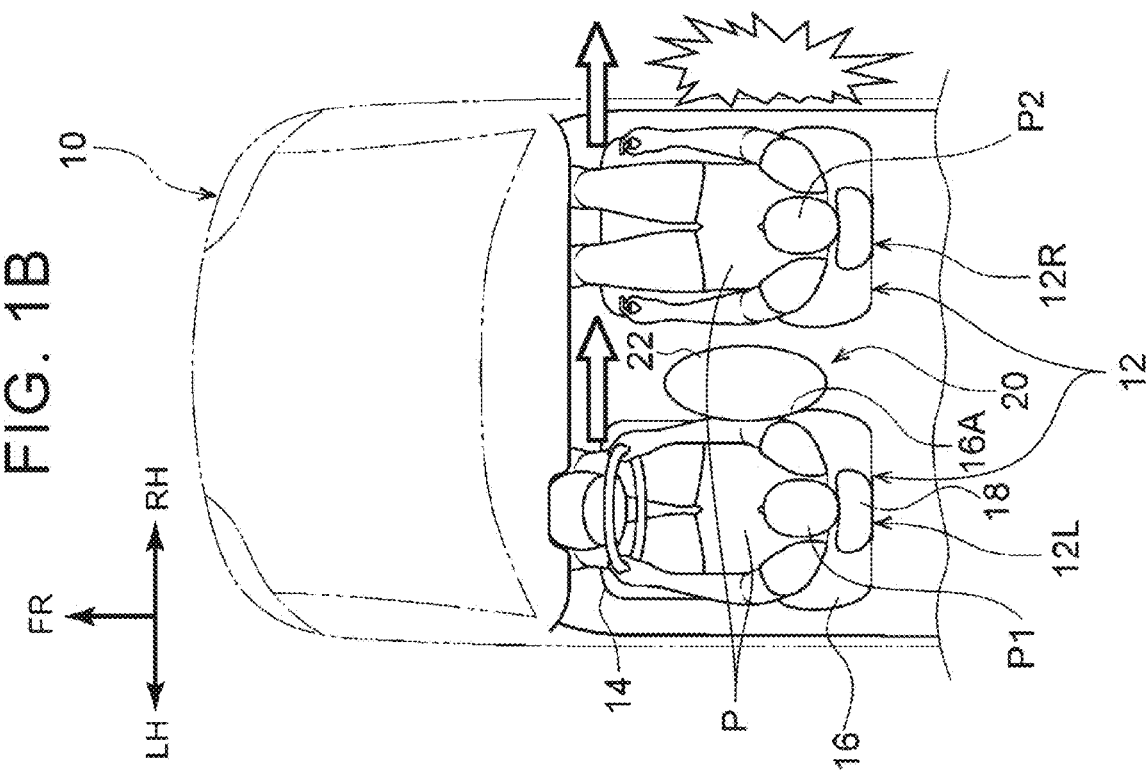
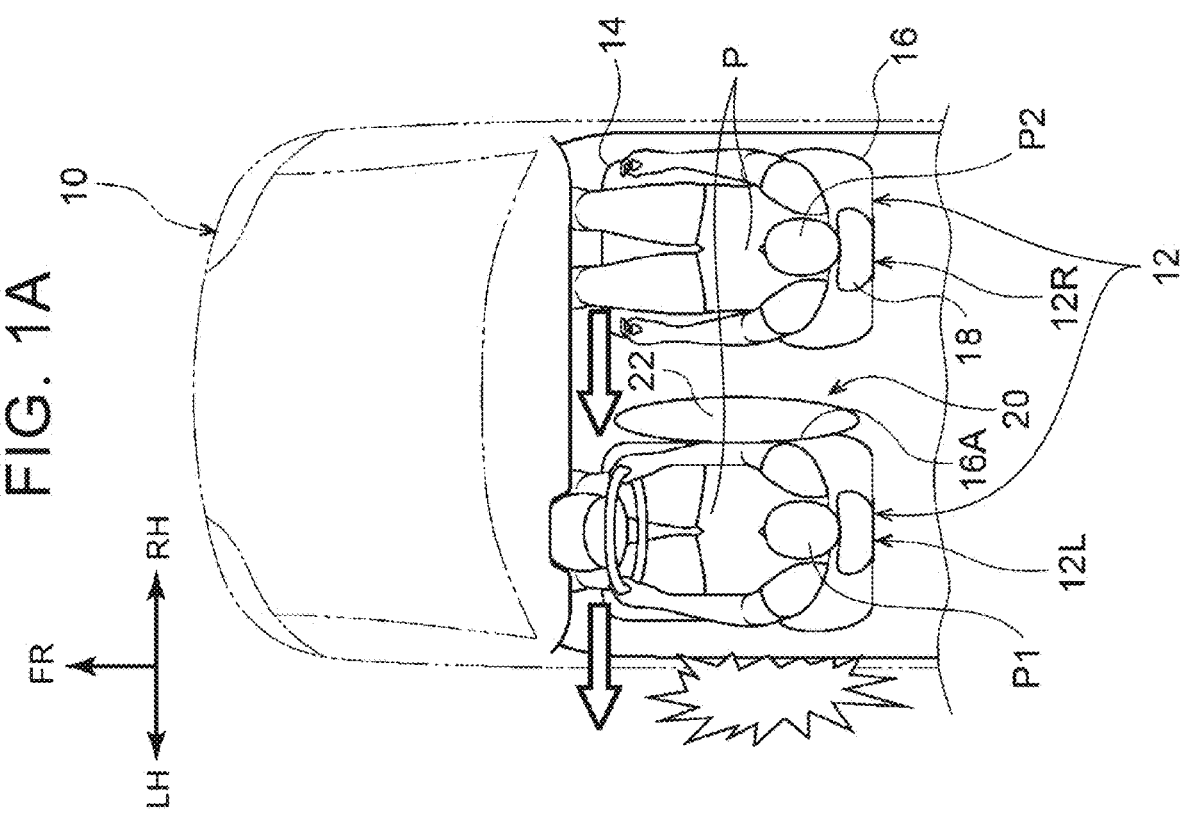

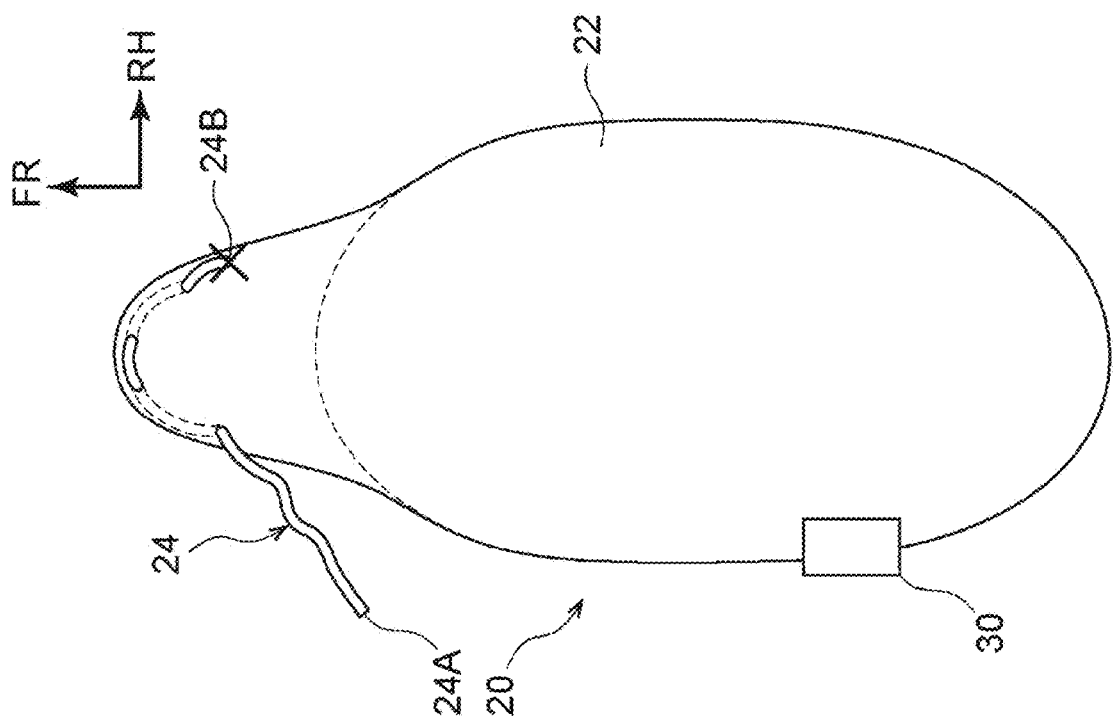
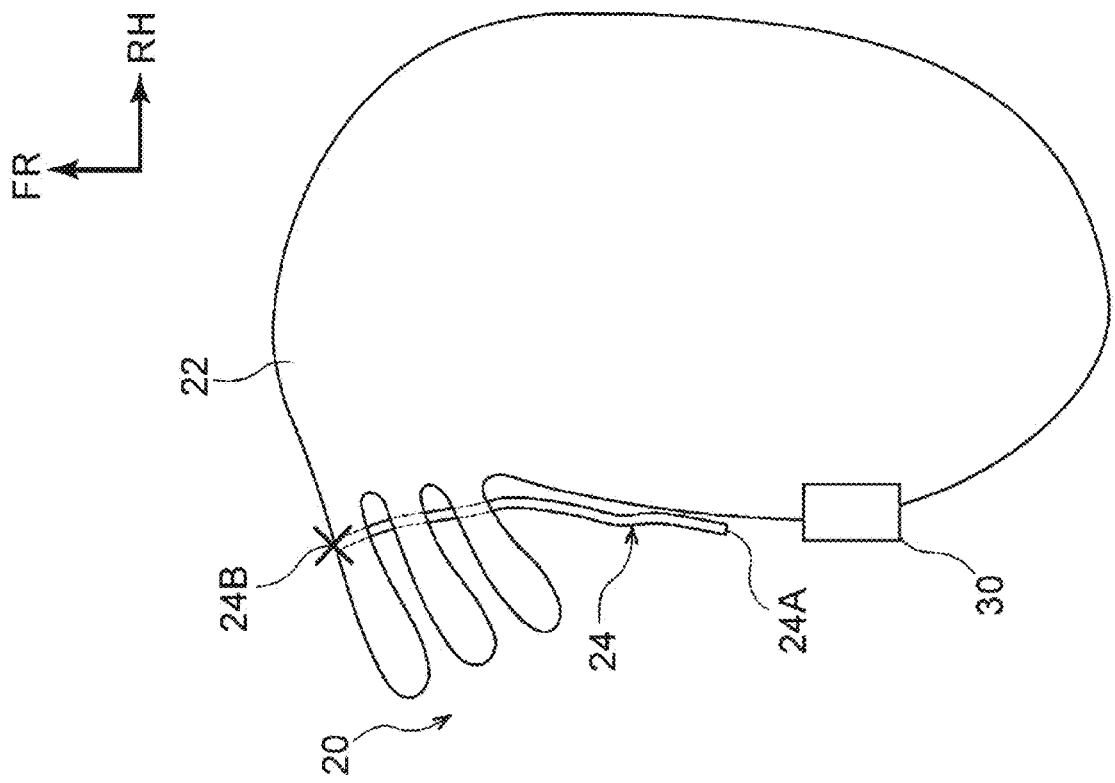

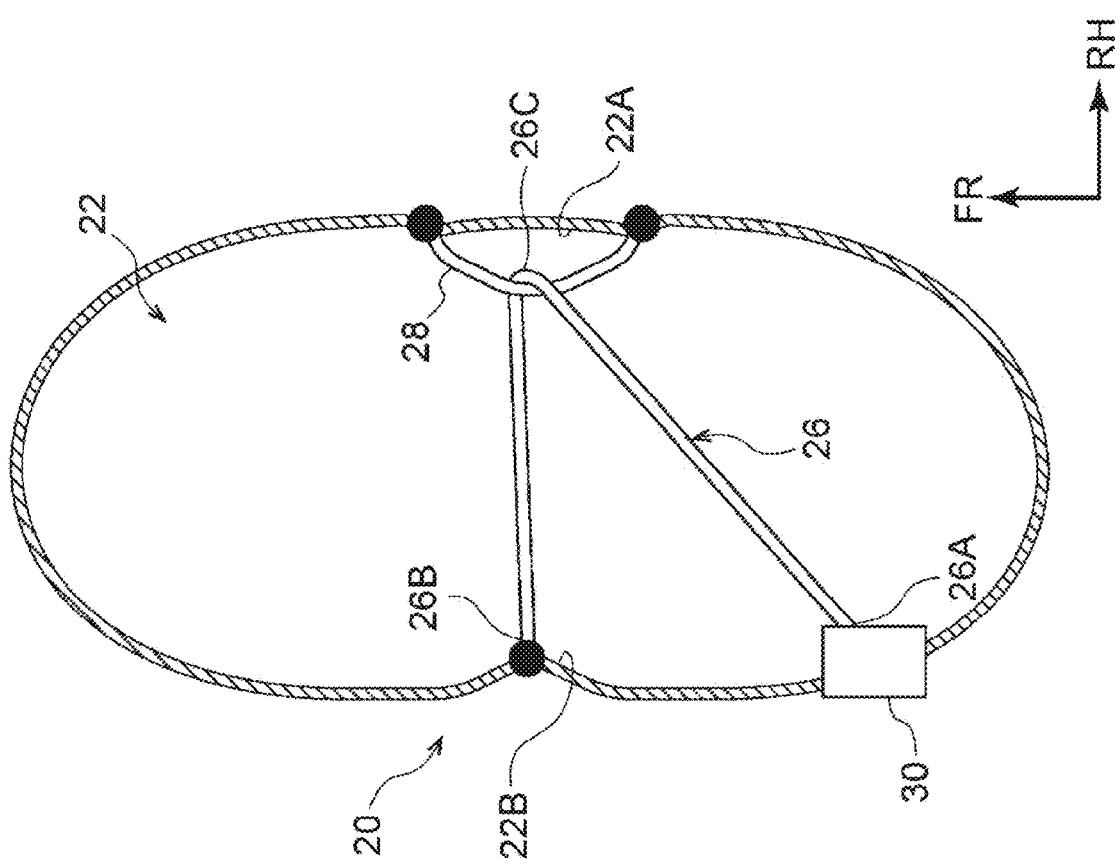
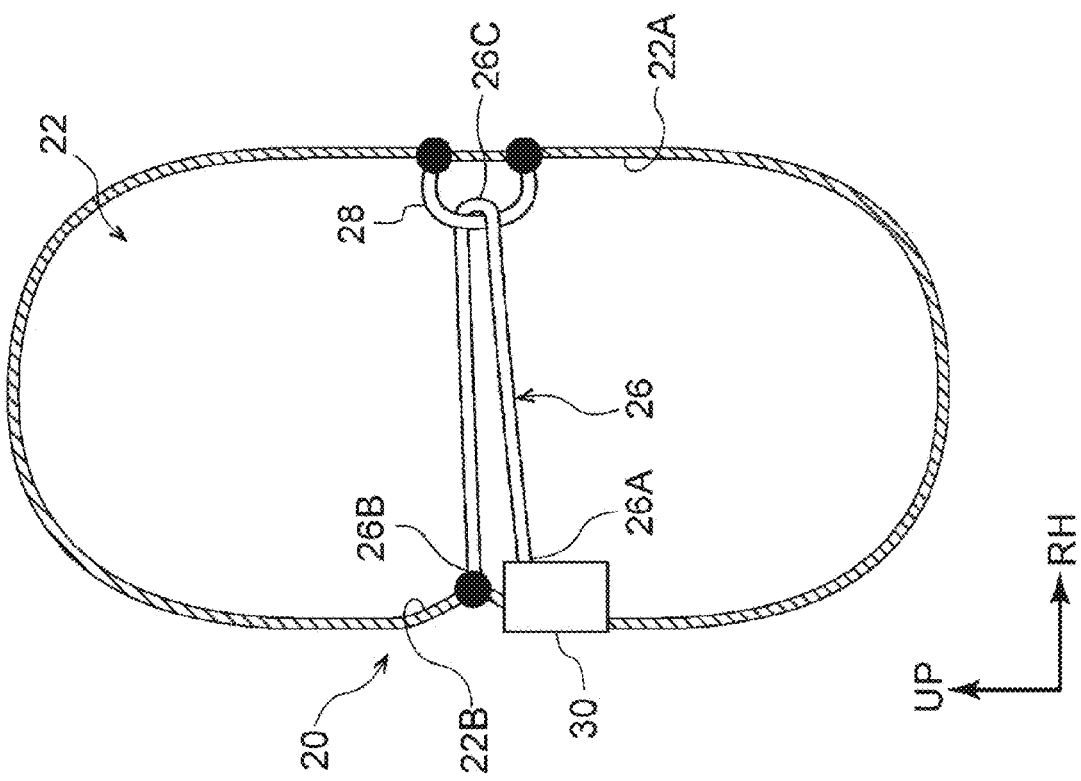

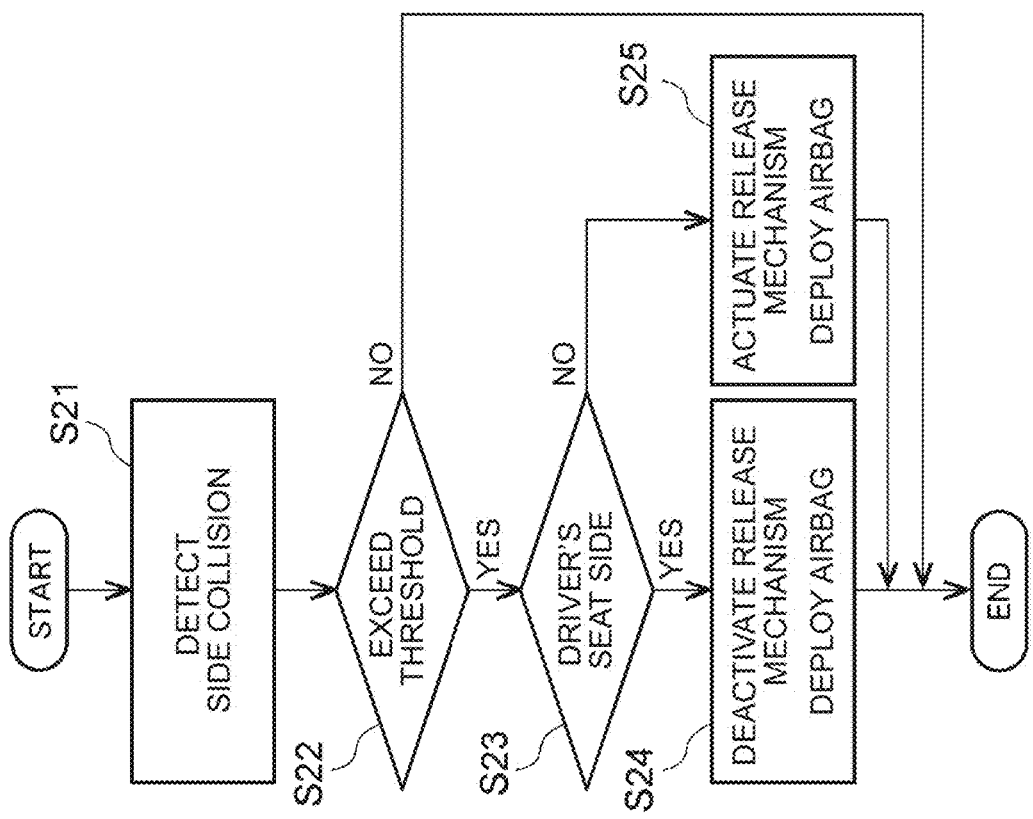
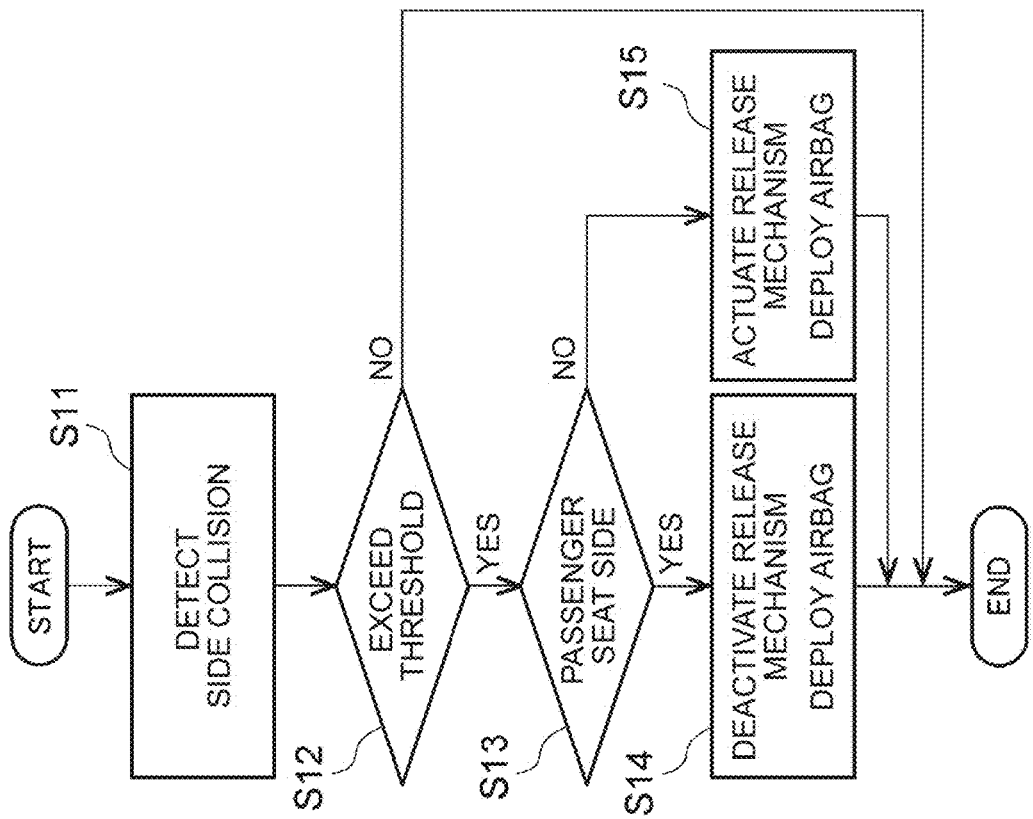

FRONT CENTER AIRBAG DEVICE FOR VEHICLE

CROSS-REFERENCE TO RELATED APPLICATION

This application claims priority to Japanese Patent Application No. 2024-011059 filed on Jan. 29, 2024, incorporated herein by reference in its entirety.

BACKGROUND

1. Technical Field

The present disclosure relates to front center airbag devices for vehicles.

2. Description of Related Art

Front center airbag devices are conventionally known in the art. A front center airbag device is installed at the inner side in the vehicle width direction of a seatback of a driver's seat, and is configured to be inflated and deployed between the driver's seat and an adjacent passenger seat (see, for example, Japanese Unexamined Patent Application Publication No. 2019-059250 (JP 2019-059250 A)). There is a front center airbag device configured so that its deployed state varies depending on whether there is an occupant only in the driver's seat or there are occupants in both the driver's seat and the passenger seat.

Specifically, when there is an occupant only in the driver's seat, a main chamber and a sub chamber are deployed toward the front of the vehicle so that the front part of a front center airbag is deployed to a greater extent and an appropriate internal pressure of the front center airbag is maintained. On the other hand, when there are occupants in both the driver's seat and the passenger seat, the main chamber and the sub chamber are deployed toward the bottom of the vehicle so that the lower part of the front center airbag is deployed to a greater extent and the internal pressure of the front center airbag is reduced.

SUMMARY

In the above front center airbag device, however, whether a side collision of the vehicle occurs on the driver's seat side or the passenger seat side is not considered. In order to appropriately protect occupants regardless of whether a side collision of the vehicle occurs on the driver's seat side or the passenger seat side, it is necessary to increase both the length in the vehicle front-rear direction and thickness in the vehicle width direction of the front center airbag (hereinafter referred to as "increase the size of the front center airbag"). However, since the front center airbag is installed at the inner side in the vehicle width direction of the seatback of the driver's seat, the front center airbag is desired to be small in size.

Therefore, an object of the present disclosure is to provide a front center airbag device for a vehicle that can reduce an increase in size of a front center airbag and that can also appropriately protect occupants by the front center airbag regardless of whether a side collision of the vehicle occurs on the driver's seat side or on the passenger seat side.

In order to achieve the above object, a front center airbag device for a vehicle according to a first aspect of the present disclosure include a front center airbag installed at an inner side in a vehicle width direction of a seatback of a vehicle seat that is a driver's seat, and configured to be inflated and deployed when a gas is supplied from an inflator. The front center airbag is configured to have a larger deployment region in a vehicle front-rear direction and a smaller internal pressure when a side collision of the vehicle occurs on a driver's seat side than when the side collision of the vehicle occurs on a passenger seat side.

According to the disclosure of the first aspect, the front center airbag configured to be inflated and deployed when a gas is supplied from the inflator is installed at the inner side in the vehicle width direction of the seatback of the vehicle seat that is the driver's seat. When a side collision of the vehicle occurs on the driver's seat side, the front center airbag more preferably have a larger deployment region in the vehicle front-rear direction than have an increased internal pressure in order to appropriately protect the occupant in the passenger seat. When a side collision of the vehicle occurs on the passenger seat side, the front center airbag more preferably have an increased internal pressure than have a larger deployment region in the vehicle front-rear direction in order to appropriately protect the occupant in the driver's seat.

The front center airbag according to the present disclosure is configured to have a larger deployment region in the vehicle front-rear direction and a smaller internal pressure when a side collision of the vehicle occurs on the driver's seat side than when a side collision of the vehicle occurs on the passenger seat side. In other words, when a side collision of the vehicle occurs on the passenger seat side, the front center airbag according to the present disclosure will not have a larger deployment region in the vehicle front-rear direction and a smaller internal pressure than when a side collision of the vehicle occurs on the driver's seat side. Therefore, the size of the front center airbag can be reduced, and occupants can be appropriately protected by the front center airbag regardless of whether a side collision of the vehicle occurs on the driver's seat side or on the passenger seat side.

A front center airbag device for a vehicle according to a second aspect of the present disclosure includes a front center airbag installed at an inner side in a vehicle width direction of a seatback of a vehicle seat that is a driver's seat, and configured to be inflated and deployed when a gas is supplied from an inflator. The front center airbag is configured to have a smaller deployment region in a vehicle front-rear direction and a larger thickness in the vehicle width direction when a side collision of the vehicle occurs on a passenger seat side than when the side collision of the vehicle occurs on a driver's seat side.

According to the disclosure of the second aspect, the front center airbag configured to be inflated and deployed when a gas is supplied from the inflator is installed at the inner side in the vehicle width direction of the seatback of the vehicle seat that is the driver's seat. When a side collision of the vehicle occurs on the passenger seat side, the front center airbag more preferably have a larger thickness in the vehicle width direction than have a larger deployment region in the vehicle front-rear direction in order to appropriately protect the occupant in the driver's seat. When a side collision of the vehicle occurs on the driver's seat side, the front center airbag more preferably have a larger deployment region in the vehicle front-rear direction than have a larger thickness in the vehicle width direction in order to appropriately protect the occupant in the passenger seat.

The front center airbag according to the present disclosure is configured to have a smaller deployment region in the vehicle front-rear direction and a larger thickness in the vehicle width direction when a side collision of the vehicle occurs on the passenger seat side than when a side collision of the vehicle occurs on the driver's seat side. In other words, the front center airbag according to the present disclosure has a smaller thickness in the vehicle width direction and a larger deployment region in the vehicle front-rear direction when a side collision of the vehicle occurs on the driver's seat side than when a side collision of the vehicle occurs on the passenger seat side. Therefore, the size of the front center airbag can be reduced, and occupants can be appropriately protected by the front center airbag regardless of whether a side collision of the vehicle occurs on the driver's seat side or on the passenger seat side.

A front center airbag device for a vehicle according to a third aspect of the present disclosure is the front center airbag device according to the first aspect. Part of the front center airbag may be folded like a bellows and restrained by a cord member, and may be configured to be released from the cord member when the side collision of the vehicle occurs on the driver's seat side.

According to the disclosure of the third aspect, part of the front center airbag is folded like a bellows and restrained by the cord member, and is configured to be released from the cord member when the side collision of the vehicle occurs on the driver's seat side. Therefore, an increase in size of the front center airbag is avoided with a simple configuration, and as a result, the size of the inflator is reduced.

A front center airbag device for a vehicle according to a fourth aspect of the present disclosure is the front center airbag device according to the second aspect. The front center airbag may be restrained by a cord member so as to have a smaller thickness in the vehicle width direction, and may be configured be released from the cord member when the side collision of the vehicle occurs on the passenger seat side.

According to the disclosure of the fourth aspect, the front center airbag is restrained by the cord member so as to have a smaller thickness in the vehicle width direction, and is configured be released from the cord member when the side collision of the vehicle occurs on the passenger seat side. Therefore, an increase in size of the front center airbag is avoided with a simple configuration, and as a result, the size of the inflator is reduced.

A front center airbag device for a vehicle according to a fifth aspect of the present disclosure is the front center airbag device according to the fourth aspect. A plurality of the cord members may be provided.

According to the fifth aspect of the present disclosure, the plurality of cord members is provided. Therefore, the state in which the front center airbag has a small thickness in the vehicle width direction and has a large deployment region in the vehicle front-rear direction is more effectively implemented compared to the case where only one cord member is provided.

As described above, the present disclosure can reduce an increase in size of the front center airbag and can also appropriately protect occupants by the front center airbag regardless of whether a side collision of the vehicle occurs on the driver's seat side or on the passenger seat side.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1A is a schematic plan view showing a case where a side collision occurs on the driver's seat side of a vehicle equipped with a front center airbag device for a vehicle according to a first embodiment;

FIG. 1B is a schematic plan view showing a case where a side collision occurs on the passenger seat side of a vehicle equipped with the front center airbag device for a vehicle according to the first embodiment;

FIG. 3A is a schematic plan view showing a deployed state of the front center airbag according to the first embodiment when a side collision occurs on the passenger seat side;

FIG. 3B is a schematic plan view showing a deployed state of the front center airbag according to the first embodiment when a side collision occurs on the driver's seat side;

FIG. 4A is a schematic rear view showing a deployed state of a front center airbag according to a second embodiment and a strap provided inside the front center airbag when a side collision occurs on the driver's seat side;

FIG. 4B is a schematic plan view showing a deployed state of the front center airbag according to the second embodiment and a strap provided inside the front center airbag when a side collision occurs on the driver's seat side;

FIG. 6A is a flowchart showing a process of activating the front center airbag device for a vehicle according to the first embodiment; and FIG. 6B is a flowchart showing a process of activating the front center airbag device for a vehicle according to the second embodiment.

DETAILED DESCRIPTION OF EMBODIMENTS

Figure 2:
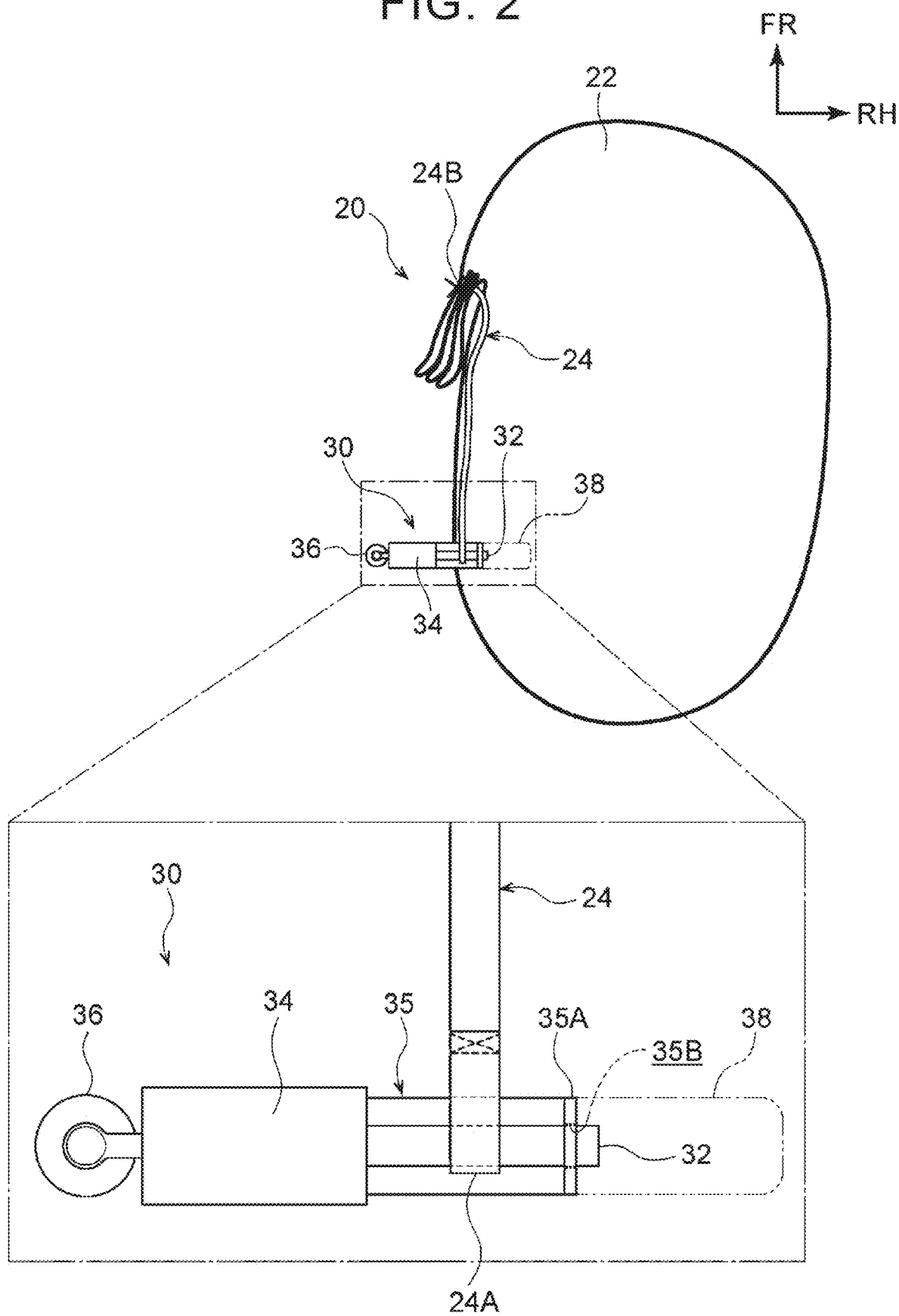
FIG. 2 is a schematic plan view illustrating a configuration of a front center airbag device for a vehicle according to the first embodiment in a partially enlarged manner.

Hereinafter, an embodiment according to the present disclosure will be described in detail with reference to the drawings. For convenience of explanation, an arrow UP shown in the drawings is defined as a vehicle upward direction, an arrow FR is defined as a vehicle forward direction, an arrow LH is defined as a vehicle leftward direction, and an arrow RH is defined as a vehicle rightward direction. Thus, when terms indicating directions, i.e., upward and downward, forward and rearward, and right and left are used in the following description without any specification, these mean upward and downward of the vehicle, forward and rearward of the vehicle, and right and left of the vehicle. Further, the right-left direction is synonymous with a vehicle width direction.

As shown in FIGS. 1A and 1B, the vehicle 10 according to the present embodiment is, for example, a vehicle having a left steering wheel, in which the vehicle seat 12 on the left side is a driver's seat 12L and the vehicle seat 12 on the right side is a passenger seat 12R. In addition, the occupant P shown in the drawing is an occupant corresponding to AM50 (50th percentile of American adult men) of WorldSID (World Side Impact Dummy). In the following description, an occupant seated on the driver's seat 12L is referred to as an "occupant P1", and an occupant seated on the passenger seat 12R is referred to as an "occupant P2" in some cases.

First Embodiment

First, a first embodiment will be described. As shown in FIGS. 1A and 1B, the right and left vehicle seats 12 (the driver's seat 12L and the passenger seat 12R) provided as front seats on the vehicle 10 include a seat cushion 14 that supports the buttocks and thighs of the occupant P, a seatback 16 that supports the back of the occupant P, and a headrest 18 that supports the head of the occupant P, respectively. The occupant P seated on each vehicle seat 12 is restrained by a seat belt device (not shown).

The vehicle front center airbag device 20 according to the first embodiment is mounted at an inner side 16A in the vehicle width direction of the seatback 16 of the driver's seat 12L. The vehicle front center airbag device 20 includes an inflator (not shown) and a front center airbag (far-side airbag) 22. The inflator is embedded in the side 16A of the seatback 16. The front center airbag inflates and deploys when the gas ejected from the inflator is supplied to the inside.

The inflator is, for example, a cylinder-type gas generating device formed in a substantially cylindrical shape, and the axial direction thereof is a direction (substantially vertical direction) along a side frame (not shown) constituting the skeleton of the right and left side portions of the seatback 16. The inflator operates when a side collision of the vehicle 10 is detected or predicted (hereinafter, referred to as "side collision"), and is capable of instantaneously supplying gas to the inside of the front center airbag (hereinafter, simply referred to as "airbag") 22.

The airbag 22 is formed in a single bag shape by sewing the outer peripheral edges of the two base fabrics to each other. The airbag 22 is formed so as to be capable of expanding and expanding inward in the vehicle width direction of the occupant P1 seated on the driver's seat 12L by supplying the gas ejected from the inflator to the inside, and covering at least the buttocks of the occupant P1 to the head in a side view.

Here, as shown in FIGS. 1A and 1B, in a configuration in which the vehicles 10 collide with each other on the side surface, there are a case in which a side collision occurs on the driver's seat side and a case in which a side collision occurs on the passenger's seat side. The airbag 22 according to the first embodiment is configured such that, when the side collision of the vehicle 10 is on the driver's seat side, the deployment region in the front-rear direction is larger and the internal pressure is smaller than when the side collision of the vehicle 10 is on the passenger's seat side.

Specifically, as shown in FIG. 2, a part of the front side of the airbag 22 is folded in a bellows shape and is restrained by a strap 24 as a cord member. The airbag 22 is configured such that when the side collision of the vehicle 10 is on the driver's seat side, the restraint by the strap 24 is released.

The release mechanism 30 for releasing the restraint of the strap 24 is provided on the side 16A of the seatback 16 of the driver's seat 12L, and is configured as follows, for example. That is, the release mechanism 30 includes a cylindrical pin 32, a holding portion 34 for holding one end portion of the pin 32, and a cover portion 38 for accommodating the pin 32 removed from the holding portion 34. The cylindrical pin 32 is inserted through one end 24A of the strap 24.

A support plate 35 that holds the other end portion of the pin 32 extends from the holding portion 34, and the other end portion of the pin 32 is inserted into and supported by a through-hole 35B formed on the distal end portion 35A of the support plate 35. The opening portion of the cover portion 38 is attached to the distal end portion 35A of the support plate 35.

An inflator 36 is connected to the holding portion 34. When the side collision of the vehicle 10 is on the driver's seat side, the inflator 36 is operated to eject a gas into the holding portion 34, and the pin 32 is ejected by the pressure of the gas, thereby removing the pin 32 from the one end 24A of the strap 24. The injected pin 32 is accommodated in the cover portion 38.

The other end portion 24B of the strap 24 is pierced through the bellows-shaped folded portion of the airbag 22, and the other end portion 24B is sewn and attached to the airbag 22 so as not to fall off the airbag 22.

Therefore, when the restraint on the one end 24A of the strap 24 is released by the release mechanism 30 when the side collision of the vehicle 10 is on the driver's seat side, as shown in FIG. 3A, the airbag 22 expands so that the gas enters the bellows-like folded portion and becomes longer in the front-rear direction, as shown in FIG. 3B. The airbag 22 thereby has a slightly lower internal pressure.

Although not shown in the drawings, a sensor for detecting or predicting a side collision and a sensor for detecting or predicting whether the side collision is a driver's seat side or a passenger's seat side are provided on both right and left sides of the vehicle 10. The vehicle 10 is provided with a control device electrically connected to the sensors and electrically connected to the inflator of the airbag 22 and the inflator 36 of the release mechanism 30. That is, the control device controls the operation of the inflator of the airbag 22 and the inflator 36 of the release mechanism 30 according to the detection or prediction result of each sensor.

Next, the operation of the vehicle front center airbag device 20 according to the first embodiment configured as described above will be described.

In the airbag 22 inflated and deployed from the side 16A of the seatback 16 of the driver's seat 12L, when the side collision of the vehicle 10 is on the driver's seat side, it is preferable to increase the deployment region in the front-rear direction rather than increase the internal pressure in order to appropriately protect the occupant P2 on the passenger's seat side that is to be moved to the driver's seat side by the inertial force. This is because the occupant P2 on the passenger seat side is farther from the airbag 22 than the occupant P1 on the driver's seat side.

Further, in the airbag 22, when the side collision of the vehicle 10 is on the front passenger seat side, it is preferable to increase the internal pressure in order to appropriately protect the occupant P1 on the driver's seat side that is to be moved to the front passenger seat side by the inertial force, rather than increasing the deployment region in the front-rear direction. This is because the occupant P1 on the driver's seat side is closer to the airbag 22 than the occupant P2 on the passenger seat side, and there is no reaction force surface when there is no occupant P2 on the passenger seat side.

Therefore, in the vehicle front center airbag device 20 according to the first embodiment, the length and the internal pressure in the front-rear direction are different depending on whether the side collision of the vehicle 10 is on the driver's seat side or the passenger's seat side. That is, as shown in FIG. 6A, first, a side collision of the vehicles 10 is detected (S11). It is then S12 whether the impact of the side collision exceeds the thresholds that require deployment of the airbag 22. If it is determined that S12 that the impact of the side collision does not exceed the threshold, the airbag 22 is terminated without being inflated and deployed.

On the other hand, if it is determined in S12 that the threshold is exceeded, then it is determined whether or not the side collision is the passenger seat side (S13). In S13, when it is determined that the side collision of the vehicle 10 is the passenger seat side, the inflator 36 of the release mechanism 30 is not activated, and only the inflator of the airbag 22 is activated, and the airbag 22 is inflated and deployed (S14).

That is, the airbag 22 is inflated and deployed in a state in which a part of the front portion side is folded in a bellows shape. Therefore, in the airbag 22 at this time, the deployment region in the front-rear direction is not increased, and the internal pressure is not decreased (the internal pressure is set to be high). Therefore, when a side collision occurs on the passenger seat side of the vehicle 10, it is possible to appropriately protect the occupant P1 that is seated on the driver's seat 12L and that is to be moved toward the passenger seat side by the inertial force.

On the other hand, in S13, when it is determined that the side collision of the vehicle 10 is not on the passenger seat side, that is, on the driver's seat side, not only the inflator of the airbag 22 but also the inflator 36 of the release mechanism 30 is activated, and the airbag 22 is inflated and deployed. That is, the restraint on the one end 24A of the strap 24 is released, and the airbag 22 is inflated and deployed (S15) including the part folded in the bellows shape.

Therefore, the airbag 22 at this time has a large deployment region in the front-rear direction, and the internal pressure is thereby slightly reduced. Therefore, when a side collision occurs on the driver's seat side of the vehicle 10, it is possible to appropriately protect the occupant P2 that is seated on the passenger seat 12R and that is to be moved toward the driver's seat side by the inertial force.

As described above, according to the vehicle front center airbag device 20 of the first embodiment, it is possible to suppress an increase in the size of the airbag 22, and it is possible to suppress a decrease in the mountability of the seatback 16 on the side 16A. At the same time, it is possible to appropriately protect the occupant P by the airbag 22 on the collision side of the vehicle 10 at the driver's seat side and the passenger's seat side at the time of side collision.

Moreover, in the vehicle front center airbag device 20 according to the first embodiment, a part of the front portion side of the airbag 22 is folded in a bellows shape and restrained by the strap 24. When the side collision of the vehicle 10 is on the driver's seat side, the restraint by the strap 24 is released. Therefore, it is possible to avoid an increase in the size of the airbag 22 with a simple configuration, and as a result, it is possible to reduce the size of the inflator that supplies the gas to the airbag 22. That is, a low-output inflator is required.

Second Embodiment

Next, a second embodiment will be described. The same parts as those in the first embodiment are designated by the same reference signs, and detailed description thereof will be omitted as appropriate.

As shown in FIGS. 4A and 4B, the airbag 22 according to the second embodiment is configured such that, when the side collision of the vehicle 10 is on the passenger seat side, the deployment region in the front-rear direction is smaller and the thickness along the vehicle width direction is larger than when the side collision of the vehicle 10 is on the driver's seat side.

Specifically, in the airbag 22, a substantially central portion in the front-rear direction and the up-down direction is restrained by a strap 26 as a cord member provided inside the airbag 22 so as to reduce the thickness along the vehicle width direction. When the side collision of the vehicle 10 is on the passenger seat side, the restraint by the strap 26 is released. The mechanism for releasing the restraint of the strap 26 may be the same as the release mechanism 30 in the first embodiment.

One end 26A of the strap 26 is restrained by the release mechanism 30, and the intermediate portion 26C thereof is inserted into the ring portion 28 as a strap direction changing guide provided on the inner side surface 22A of the airbag 22 in the vehicle width direction (passenger seat side) and folded back. Further, the other end 26B of the strap 26 is attached to the inner side surface 22B of the airbag 22 on the outer side in the vehicle width direction (driver's seat side) by sewing. Accordingly, when the restraint by the strap 26 is released, the thickness of the airbag 22 along the vehicle width direction is increased, and thereby the length in the front-rear direction is shortened, as shown in FIG. 5A.

Next, the operation of the vehicle front center airbag device 20 according to the second embodiment configured as described above will be described.

In the airbag 22 inflated and deployed from the side 16A of the seatback 16 of the driver's seat 12L, when the side collision of the vehicle 10 is on the front passenger seat side, it is preferable to increase the thickness along the vehicle width direction, that is, the energy-absorbing stroke, rather than to increase the deployment region in the front-rear direction. In this way, the airbag 22 can appropriately protect the occupant P1 on the driver's seat side that is to be moved toward the passenger's seat side by the inertial force. This is because the occupant P1 on the driver's seat side is closer to the airbag 22 than the occupant P2 on the passenger seat side, and there is no reaction force surface when there is no occupant P2 on the passenger seat side.

Further, in the airbag 22, when the side collision of the vehicle 10 is on the driver's seat side, it is preferable to increase the deployment region in the front-rear direction rather than to increase the thickness along the vehicle width direction. In this way, the airbag 22 can appropriately protect the occupant P2 on the passenger seat side that is to be moved toward the driver's seat side by the inertial force. This is because the occupant P2 on the passenger seat side is farther from the airbag 22 than the occupant P1 on the driver's seat side.

Therefore, in the vehicle front center airbag device 20 according to the second embodiment, the length in the front-rear direction and the thickness in the vehicle width direction are different depending on whether the side collision of the vehicle 10 is on the driver's seat side or the passenger's seat side. That is, as shown in FIG. 6B, first, a side collision of the vehicles 10 is detected (S21). It is then S22 whether a side collision exceeds the thresholds that require deployment of the airbag 22. If it is determined that S22 does not exceed the thresholds, the airbag 22 is terminated without being inflated and deployed.

On the other hand, if it is determined in S22 that the threshold is exceeded, then it is determined whether or not the side collision is the driver's seat side (S23). In S23, when it is determined that the side collision of the vehicle 10 is the driver's seat, the inflator 36 of the release mechanism 30 is not activated, and only the inflator of the airbag 22 is activated, and the airbag 22 is inflated and deployed (S24).

That is, the strap 26 inflates and deploys the airbag 22 in a state in which the thickness along the vehicle width direction is constrained to be small. Therefore, the airbag 22 at this time has a large deployment region in the front-rear direction. Therefore, when a side collision occurs on the driver's seat side of the vehicle 10, it is possible to appropriately protect the occupant P2 that is seated on the passenger seat 12R and that is to be moved toward the driver's seat side by the inertial force.

On the other hand, in S23, when it is determined that the side collision of the vehicles 10 is not the driver's seat side, that is, the passenger's seat side, not only the inflator of the airbag 22 but also the inflator 36 of the release mechanism 30 is activated, and the airbag 22 is inflated and deployed. That is, the airbag 22 is inflated and deployed (S25) while the restraint on the one end 26A of the strap 26 is released.

Therefore, the airbag 22 at this time has a large thickness along the vehicle width direction, and thereby has a small deployment region in the front-rear direction. Therefore, when a side collision occurs on the passenger seat side of the vehicle 10, it is possible to appropriately protect the occupant P1 who sits on the driver's seat 12L and attempts to move toward the passenger side by inertial force.

As described above, according to the vehicle front center airbag device 20 of the second embodiment, it is possible to suppress an increase in the size of the airbag 22, and it is possible to suppress a decrease in the mountability of the seatback 16 on the side 16A. At the same time, it is possible to appropriately protect the occupant P by the airbag 22 on the collision side of the vehicle 10 at the driver's seat side and the passenger's seat side at the time of side collision.

Moreover, in the vehicle front center airbag device 20 according to the second embodiment, the strap 26 alone restrains the airbag 22 so as to reduce the thickness along the vehicle width direction. When the side collision of the vehicle 10 is on the passenger seat side, the restraint by the strap 26 is released. Therefore, it is possible to avoid an increase in the size of the airbag 22 with a simple configuration, and as a result, it is possible to reduce the size of the inflator that supplies the gas to the airbag 22. That is, a low-output inflator is required.

Figure 5B:
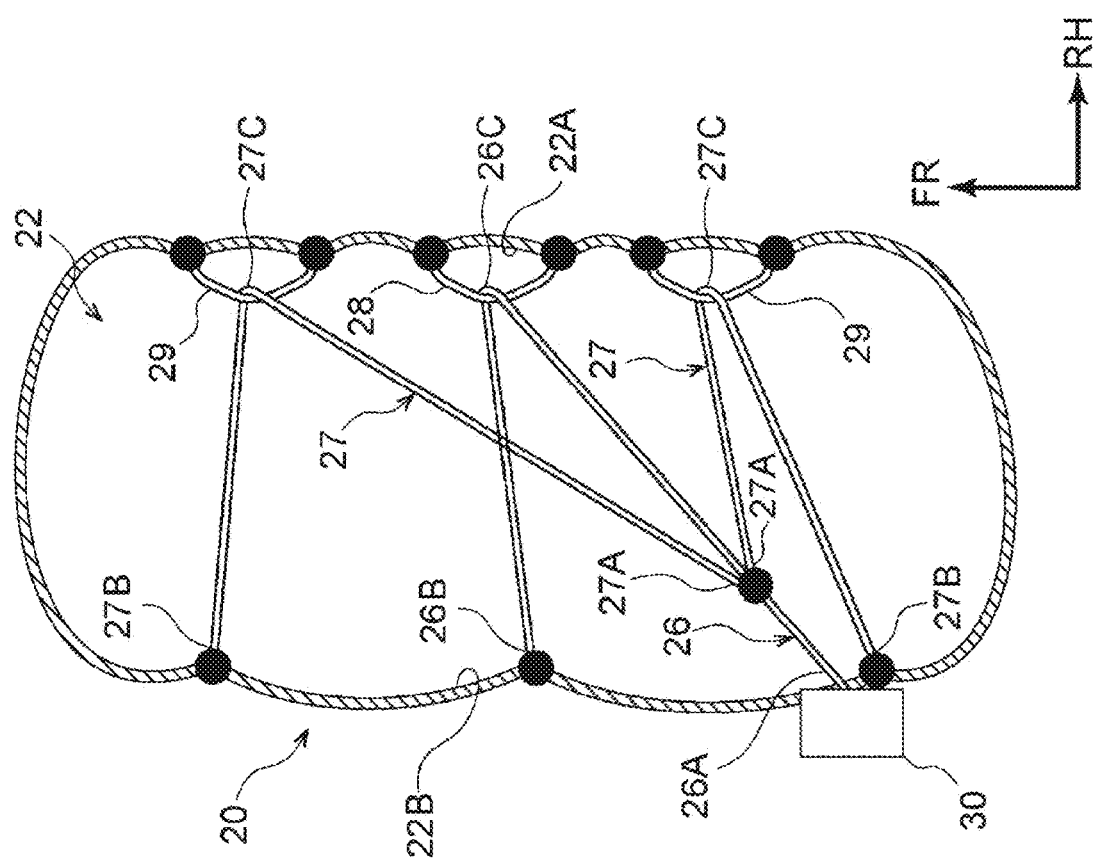
FIG. 5B is a schematic plan view showing a deployed state of a front center airbag according to a modification of the second embodiment and a strap provided inside the front center airbag when a side collision occurs on the driver's seat side.
Figure 5A:
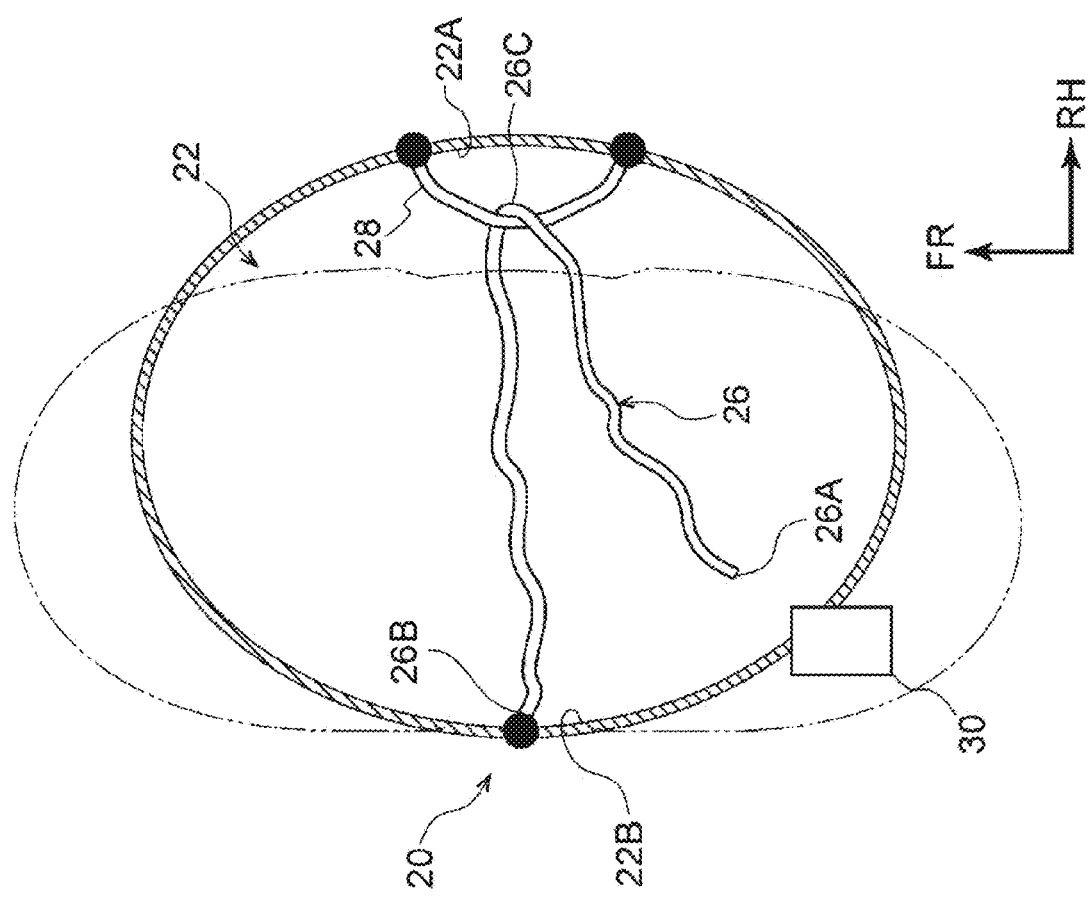
FIG. 5A is a schematic plan view showing a deployed state of the front center airbag according to the second embodiment and a strap provided inside the front center airbag when a side collision occurs on the passenger seat side.

As shown in FIG. 5B, one end 27A of a plurality (for example, two) of straps 27 is further connected to one end 26A of the strap 26. In addition, a plurality of ring portions 29 as strap-direction changing guides (for example, one ring portion on each of the front side and the rear side of the ring portion 28) may be provided on the inner side surface 22A of the airbag 22 on the inner side in the vehicle width direction (passenger seat side).

That is, similarly to the strap 26, each strap 27 may be folded back by inserting the intermediate portion 27C into each of the ring portions 29, and the other end portion 27B may be attached to the inner side surface 22B of the airbag 22 on outer side in the vehicle width direction (driver's seat side) by sewing. According to this configuration, in the airbag 22, it is possible to more effectively realize a state in which the thickness along the vehicle width direction is smaller and the deployment region in the front-rear direction is larger than in the case where the strap 26 is provided as a single unit.

The vehicle front center airbag device 20 according to the present embodiment has been described above with reference to the drawings. The vehicle front center airbag device 20 according to the present embodiment is not limited to the illustrated one, and can be appropriately changed in design without departing from the gist of the present disclosure. For example, the release mechanism 30 is not limited to the illustrated mechanism.

What is claimed is:

1. A front center airbag device for a vehicle, the front center airbag device comprising a front center airbag installed at an inner side in a vehicle width direction of a seatback of a vehicle seat that is a driver's seat, and configured to be inflated and deployed when a gas is supplied from an inflator, wherein the front center airbag is configured to have a larger deployment region in a vehicle front-rear direction and a smaller internal pressure when a side collision of the vehicle occurs on a driver's seat side than when the side collision of the vehicle occurs on a passenger seat side.

2. A front center airbag device for a vehicle, the front center airbag device comprising a front center airbag installed at an inner side in a vehicle width direction of a seatback of a vehicle seat that is a driver's seat, and configured to be inflated and deployed when a gas is supplied from an inflator, wherein the front center airbag is configured to have a smaller deployment region in a vehicle front-rear direction and a larger thickness in the vehicle width direction when a side collision of the vehicle occurs on a passenger seat side than when the side collision of the vehicle occurs on a driver's seat side.

3. The front center airbag device according to claim 1, wherein part of the front center airbag is folded like a bellows and restrained by a cord member, and is configured to be released from the cord member when the side collision of the vehicle occurs on the driver's seat side.

4. The front center airbag device according to claim 2, wherein the front center airbag is restrained by a cord member so as to have a smaller thickness in the vehicle width direction, and is configured be released from the cord member when the side collision of the vehicle occurs on the passenger seat side.

5. The front center airbag device according to claim 4, wherein a plurality of the cord members is provided.

* * * * *